United States Patent [19]

Akiyama et al.

[11] 4,160,752

[45] Jul. 10, 1979

[54] PROCESS FOR MAKING CLOSURE SEALING COMPOUNDS AND OTHER LATEX BASED PREPARATIONS

[75] Inventors: Robert H. Akiyama, Scituate; Leo B. Towle, Bedford, both of Mass.

[73] Assignee: W. R. Grace & Co., Cambridge, Mass.

[21] Appl. No.: 739,462

[22] Filed: Nov. 8, 1976

[51] Int. Cl.² ............................................. C08J 3/20
[52] U.S. Cl. ............................ 260/27 BB; 106/308 Q; 260/24; 260/27 R; 260/29.7 EM
[58] Field of Search ............... 260/24, 29.2 UA, 34.2, 260/29.7 B, 29.7 SQ, 27 BB, 29.7 EM, 27 R; 106/308 Q

[56] References Cited

U.S. PATENT DOCUMENTS 3,775,360   11/1973   Smith ............................... 106/308 Q

*Primary Examiner*—Veronica P. Hoke
*Attorney, Agent, or Firm*—Lowell H. McCarter; C. Edward Parker

[57] ABSTRACT

Water based polymeric dispersions, such as closure sealing compounds, which comprise a polymer latex, a resin component and a particulate nonplastic component such as fillers and pigments, can yield improved sealing, adhesion, preservative or decorative films when they are prepared by first suspending the inorganic particulate fillers and pigments in the molten resin components of the formulation, then emulsifying this suspension in water and finally combining the aqueous dispersion obtained with the rubber latex and the other ingredients of the final compound.

6 Claims, No Drawings

PROCESS FOR MAKING CLOSURE SEALING COMPOUNDS AND OTHER LATEX BASED PREPARATIONS

BACKGROUND OF THE INVENTION

Compositions containing natural or synthetic rubber dispersed or dissolved in a volatile solvent or in an aqueous medium have long been used in the manufacture of "flowed in" gaskets for container closures. In preparing these gaskets, a band of the fluid composition is deposited by means of a nozzle into the sealing area of the closure, i.e. the area which will ultimately engage the body of the container to achieve air-tight and liquid-tight closing. Current and foreseeable future government regulations against solvent emission have rekindled interest in the improvement of the long known and widely used water-based closure sealing compounds so that they not only can be made to perform better in their conventional applications, but also can serve to replace organic solvent-based compounds in as many sealing uses as possible.

One of the features of films or gaskets made from water-based sealing compounds is that said films or gaskets are relatively porous as opposed to films or gaskets obtained from organic solvent-based compositions. In certain applications, this porosity can cause sealing problems because of its generally adverse effects on such gasket properties as adhesion, water uptake and water retention. Porous gaskets contain many paths for water penetration and extraction of whatever water-soluble material is present. This undesirable porosity can be attributed partly to the manner in which the gasket compositions components are mixed together, said manner or process leading to preparations in which each and every component is suspended in water as discrete individual particles. Since most compositions contain large quantities of hard resins and fillers, what happens upon drying is that while the various particles come closer together as the water departs, the polymer and resin particles which theoretically could coalesce into a continuous film are prevented from doing so by the presence of the filler particles. In highly filled systems, there is not enough plastic material to coat every filler particle so that the film obtained consists of islands of resin and polymer with partially coated filler dispersed throughout. Incompletely consolidated films of that type will possess, at the film-substrate interface, large areas of substrate in direct contact with filler. No adhesion is possible at such locations.

The sealing compounds which yield such unconsolidated films are conventionally prepared by adding each component in turn to an aqueous medium as a solid or as an aqueous dispersion, to produce, as mentioned earlier, a liquid in which the polymers, the resins, the fillers and so on are suspended as individual particles.

The principal object of this invention will be to devise a process of forming aqueous sealing compositions which yield films that resemble those obtained from organic solvent-based materials in that the continuity of said films is not severely interrupted by non-adherent hydrophilic pigment and filler particles.

SUMMARY OF THE INVENTION

It has now been discovered that aqueous container sealing compounds which can yield continuous dry films are produced from conventional components when the fillers, pigments and other particulate non-plastic materials are first mixed at high shear into the molten resin and the resulting mixture emulsified in an aqueous medium. The emulsion thus obtained is then mixed with the latex and remaining ingredients to yield storage stable sealing compounds that can be used with high speed lining machinery in the manner of conventionally prepared products. The process just described is equally applicable to paints, sealants, adhesives and other standard latex based formulations which also contain a resin and a non-plastic particulate component.

DETAILED DESCRIPTION

The process of the invention will now be described in detail by means of some examples. These examples will also serve to compare the performance of conventional materials prepared by the new process to that of similar materials conventionally assembled. It must be kept in mind that these data are provided for illustrative purposes and are not intended to limit the present invention beyond the scope of the claims following this specification.

EXAMPLE I

This is a control preparation made from the listed ingredients by the conventional compounding method.

|  | % Solids | Total Weight | Solids |
|---|---|---|---|
| Ester gum resin | (46%) | 91.4 | 42.0 |
| Carbon black | (20%) | 2.0 | 0.4 |
| Titanium oxide pigment | (60%) | 16.6 | 10.0 |
| Antioxidant-hindered phenol | (46%) | 2.2 | 1.0 |
| Sodium benzoate |  | 5.0 | 5.0 |
| Sodium pentachlorophenate |  | 0.5 | 0.5 |
| Non-ionic surfactant |  | 3.0 | 3.0 |
| Sodium lauryl sulfate |  | 5.0 | 5.0 |
| Water |  | 25.0 |  |
| Aluminum silicate (Kaolin) |  | 100.0 | 100.0 |
| SBR latex | (70.9%) | 141.0 | 100.0 |
| Methyl ester of rosin | (70%) | 40.0 | 28.0 |
|  |  | 431.7 | 294.9 |
| Water |  | 37.3 |  |
|  |  | 468.0 |  |

The above listed material are all standard components of aqueous closure sealing compounds. For example, the SBR latex is a cold polymerized material containing 31% styrene units by weight in the polymer and having a Mooney viscosity of 75 to 80 MS-4 minutes at 100° C. The non-ionic surfactant is the isooctyl phenyl ether of polyethylene glycol (Triton X-100) while the antioxidant is 2,2'-methylene-bis [6-(1-methylcyclohexyl)-p-cresol]. The rosin ester is a liquid with a specific gravity of 1.025 at 20° C., a boiling point of 365° C. and an acid number of about 6. The ester gum, on the other hand, melts at about 85° C. and has an acid number of about 7 and a density of 1.095 at 25° C. The aluminum silicate has a particulate size ranging from 0.1 to 4 microns and a specific gravity of 2.58.

The above ingredients, whether solid or in aqueous suspension at the concentrations mentioned, are added to the mixing apparatus and thoroughly blended together in the order listed. This yields a grey liquid composition having a total solids content of about 63% and possessing rheological properties suitable for high speed closure lining.

EXAMPLE II

The ingredients employed here are essentially similar to those in Example I both in nature and proportions. The method of mixing them, however, is quite different.

The inorganic fillers and pigments are first mixed into the resin components of the formulation and this mixture is then dispersed in an aqueous medium containing suitable surfactants. The rubber latex is subsequently added to the resulting dispersion to yield the final closure sealing compound.

More specifically, a mixture of
  Methyl ester of rosin:28.0 parts by weight
  Ester gum resin:42.0
  Hindered phenol-antioxidant:0.7
is heated to 225° F. and the molten resins are stirred until smooth. The following pigments and fillers are then stirred into this melt gradually:
  Aluminum silicate (Kaolin):100.0 p.b.w.
  Titanium dioxide:10.0
  Carbon black:0.4

The resulting filler-resin dispersion is emulsified by first adding to it a non-ionic surfactant and then gradually mixing in the required quantity of water with high speed stirring while maintaining the temperature of the mix at 200° F., these last two ingredients being employed in the following quantities:
  Non-ionic surfactant:4.2 p.b.w.
  Water:80.0
A fungicide solution is added to complete the resin-filler dispersion, namely
  Sodium pentachlorophenate:0.2 p.b.w.
  Water:20.0
To this resin-filler dispersion, which has a solids content of 65%, is then added, in the order listed, the following ingredients
  Non-ionic surfactant:4.0 p.b.w.
  Hindered phenol (46% solids):2.2
  Sodium benzoate (40% solids):12.5
  SBR latex (70.9% solids):141.0
to yield a final closure sealing compound containing 67.4% solids by weight.

EXAMPLE III

Another control closure sealing compound is prepared by the conventional method described in Example I, and with the same ingredients except for the SBR latex. In the present instance, the material used is a latex of a 1:1 styrene-butadiene copolymer having a solids content of about 54% and a Mooney viscosity of 60 to 90 ML-4 minutes at 100° C.

EXAMPLE IV

The ingredients of Example III are compounded by the new method described in Example II to yield a sealing compound essentially similar to that produced in Example II.

Some of the properties of the new closure sealing compounds of this invention (Example II and IV) have been compared to those of conventional materials (Example I and III) by subjecting these various preparations to a water absorption test, a pick test and a tumbler test. These tests are traditionally used to measure the performance of materials designed for sealing and adhesion applications.

The Water Absorption Test

The compound to be tested is applied onto silicone release paper by means of a Gardner knife to yield a film having a thickness of approximately 10 mils when dry. The coating is air dried, the silicone paper is removed and discs of one inch in diameter are cut from the free film and weighed. The discs are immersed in distilled water at room temperature for periods of various lengths, after which they are removed, blotted gently with paper towels and immediately weighed to determine the change in weight. The water absorption is then calculated from the weighing results. The discs are then oven dried at a temperature of 180° F. for a period of 40 minutes and the extraction loss is calculated from the values obtained.

The following table illustrates the water absorption capacity determined for a closure sealing compound prepared by the method of this invention (Example II) and one prepared conventionally (Example I):

| Period of Immersion | Water Absorption and Extraction Loss | | |
|---|---|---|---|
| | Sealing Compound: Method of Mixing: | Ex. II New | Ex. I Conventional |
| | | Water Absorption (% wt) | |
| 20 minutes | | 27.8% | 33.1% |
| 1 Hour | | 23.6 | 38.7 |
| 2 hours | | 20.9 | 39.7 |
| 3 hours | | 17.9 | 31.0 |
| 24 hours | | 16.4 | 23.5 |
| 3 days | | 16.9 | 18.8 |
| 4 days | | 16.3 | 17.0 |
| 5 days | | 15.5 | 14.6 |
| | | Extraction Loss (% wt) | |
| 5 days | | 6.2% | 9.2% |

Other Observations

The water into which the compound of Example I was immersed became increasingly hazy to the point that a white precipitate was observed in the jar. The film became moderately blistered and tacky. In the case of the Example II film, on the other hand, it became slightly blistered and tacky but the water remained clear.

It appears from the above figures that the water absorption of conventionally mixed sealing compound is higher (39%) and reaches its peak later (after about two hours of immersion) than that of the compound mixed in the new manner. It should be noted in this respect that the actual quantity of water absorbed is probably greater than the figures of the table indicate because the actual weight of the film at any moment should be lower than that used for the % absorption calculations by an amount equal to that already extracted from the film at said moment.

More importantly from the point of view of beverage packaging, the film made with the composition of Example II is clearly superior to that of Example I since the absorption and extraction processes do not give rise to either haziness or a precipitate, features that are highly undesirable in such an application. As the extraction values ultimately indicate, the film made with Example II compound is a more highly consolidated structure than that formed by the Example I material and is thus less penetrable by water.

The Pick Test

Again, the compound tested is placed on a substrate, this time tinplate, to form a layer with a dry thickness of about 10 mils. After air drying, the resulting film is picked at with a pointed thin metal rod and observations are made on the behavior of the material coated.

The film made with material prepared with the ingredients and by the method of Example IV, is more extensible, elastic and flexible as evidenced by the formation of "legs" between the pick and the tinplate when the pick is moved away from the tinplate. Also, when the extended legs are released from the pick, at the limit of adhesion, the material forming said "legs" snaps back to the tinplate, unbroken. When a film made with conventionally mixed sealing compound is picked at, the "legs" formed by pulling at the film with the pick are much shorter than those in the first instance and the stretched material breaks very early in the stretching process.

It can be concluded from this behavior that films made from the compound of Example IV, that is the compound mixed according to the process of this invention, show better adhesion, film strength and flexibility than films conventionally prepared. The importance of this property becomes evident when a closure cover, a can end for instance, equipped with a gasket of such material is fastened to the body of a can in a double-seam configuration. Such a material as that mixed according to the present invention is less likely to fracture under the effect of the mechanical stress applied.

The Tumbling Test

Four-ounce jars are filled to two-thirds of their capacity with the sealing compound to be tested and are capped after adding 2% by weight, based on the rubber content, of a non-ionic surfactant such as the ios-octyl phenyl ether of polyethylene glycol (Triton X-100). The jars are placed upright on a rotating rack where they revolve end over end. A commercially acceptable product will survive 100 hours of this treatment without gelling or coagulating.

Upon testing the closure sealing compounds of Examples I and II in this manner, it was observed that the conventionally prepared material gelled after 40 hours while that prepared by the process of this invention was still good after 130 hours of rotation. Such mechanical stability of highly compounded materials is of course of crucial importance in industrial storage and handling operations which involve pumping at rapid rates and fairly high pressures for efficient transfer and for dispensing from lining nozzles.

It becomes apparent from the preceding test data that significant benefits are derived by preparing an aqueous closure sealing compound in a manner such that the particulate non-plastic components of the formulation are embedded into the resin components in such a manner that they are not present in the final dispersion as discrete, separate particles. Evidence has been presented that suggests the formation of a film without discontinuities upon application of such compounds to substrates. It is believed further that the dispersing conditions may cause a reaction between the non-plastic particles and the hot resin which may account in part for the improved mechanical behavior of the film.

Another advantage of the new mixing technique is that compounds prepared according to it are darker than conventionally prepared materials, suggesting that less colorant such as carbon black and titanium dioxide may be required to achieve the desired effect.

In any event it is obvious that the benefits of the new mixing process are not limited to the preparations tested in that the process is clearly applicable to any aqueous latex-based compound containing both a resin phase and a particulate inorganic phase.

Such material can be prepared with the various conventional materials of the art, including latexes of natural and synthetic rubbers such as the various styrene-butadiene types, polychlorobutadiene, butyl rubbers, partly carboxylated species of said preceding rubbers, mixtures thereof and the like; surface active agents including ionic materials such as the alkyl aryl sulfates and sulfonates as well as non-ionic substances such as, for instance, the substituted polyethylene glycols of the type used in the examples; fillers and colorants of suitable particle size including calcium carbonate, magnesium silicate, aluminum silicate, hydrated alumina, carbon blacks, titanium dioxide and, in proper formulations, zinc and magnesium oxides; various natural and synthetic thickners, antioxidants, defoamers, cross-linking agents, emulsion stabilizers and the like—all the foregoing enumerated types of materials being well known to the man skilled in the art.

What we claim is:

1. A process for preparing a polymer composition for use as water based film-forming compositions or as a water-based closure sealing composition comprising a resin component, particulate non-plastic materials and a natural or synthetic diene rubber latex, said process consisting of the sequential steps of
   (a) liquifying the resin component by heating to a temperature between about 150° to 210° F.,
   (b) mixing the particulate non-plastic materials into the resin at high shear rates while maintaining the resin in the liquified state whereby the particulate non-plastic materials is substantially totally incased in the resin,
   (c) dispersing the mixture from step (b) with an aqueous medium, to form an emulsion, and
   (d) blending the natural or synthetic diene rubber latex in the aqueous emulsion to form a water-based closure sealing composition.

2. The process of claim 1 wherein the resin component comprises at least one solid resin and wherein said resin component is heated to and maintained at a temperature at least 10° higher than the melting point of said resin component.

3. The process of claim 1 wherein the latex is a styrene-butadiene copolymer dispersion and the particulate non-plastic materials comprise finely divided inorganic fillers and pigments.

4. The process of claim 3 wherein the filler and pigments are selected from the group consisting of aluminum silicate, titanium dioxide, carbon black and mixtures thereof.

5. An aqueous based polymeric dispersion comprising a natural or synthetic rubber polymer, a resin component and finely divided particulate non-plastic material, wherein said particulate material is substantially totally encased in the resin particles.

6. An aqueous polymeric sealing composition prepared by the process of claim 1 in which the particulate non-plastic materials are enclosed within the dispersed resin phase.

* * * * *